United States Patent Office 3,342,918
Patented Sept. 19, 1967

3,342,918
PROCESS OF FORMING SHAPED ARTICLES FROM SOLID, FUSIBLE REACTION PRODUCTS OF BIS-(2,3-EPOXY-CYCLOPENTYL)ETHER AND AROMATIC AMINES
John L. Welch, Jr., Bound Brook, Ralph F. Sellers, Somerset, and John J. Madden, New Brunswick, N.J., assignors to Union Carbide Corporation, a corporation of New York
No Drawing. Filed Sept. 9, 1963, Ser. No. 307,289
8 Claims. (Cl. 264—134)

This invention relates to solid, fusible reaction products of bis(2,3-epoxycyclopentyl)ether and aromatic amines; and to heat-hardenable compositions based thereon. More particularly, this invention relates to a process for impregnating materials, such as glass filaments and glass cloth, utilizing the products and compositions of this invention, to form impregnated material of excellent shelf life which, when subsequently shaped and heated at appropriate temperatures, forms structures characterized by improved physical properties at relatively high temperatures.

The production of shaped articles, as for example, laminates and filament wound structures, has been usually accomplished by impregnating a desired material with an epoxy varnish, that is, an epoxy dissolved in a suitable solvent; and in the case of a laminate, stacking plies of such impregnated material, one upon another, and heating the stacked piles at an appropriate temperature, under pressure, whereby the epoxy cures to an infusible product uniting the plies into a unitary structure. With respect to a filament wound structure, filaments are impregnated with an epoxy varnish and then wound into a desired shape, by methods which are well-known in the art. The filament wound structure is then heated to temperatures such that the epoxy is cured to an infusible product which maintains the desired shape of the structure.

In the production of laminates and of filament wound structures in which an epoxy varnish is used, two serious problems have arisen, namely, the poor shelf life of the impregnated material, and the relatively poor physical properties of the ultimate structure.

As an illustration, utilizing an epoxy varnish based on diglycidylether of 2,2-bis(4-hydroxyphenyl)propane and containing a commonly used hardener for the diglycidylether, for example, 4,4'-diaminodiphenylmethane, to impregnate glass cloth, glass filaments and the like, has resulted in an impregnated material of poor shelf life. That is, the impregnated material cannot be stored for relatively long periods of time without the diglycidylether curing to an infusible product. Obviously, once the diglycidylether cures to an infusible product, the material which has been impregnated therewith cannot be used successfully to prepare structures of desired shape.

In addition to the problem of poor shelf life, as previously discussed, it has also been found that impregnating materials with a varnish containing, in admixture, an epoxy and a hardener therefor and subsequently forming the impregnated materials into a shaped structure, results in the production of an article which is characterized by poor high temperature properties.

The present invention relates to solid, fusible reaction products of bis(2,3-epoxycyclopentyl)ether and aromatic amines which, when dissolved in suitable solvents to form varnishes utilized to impregnate glass filaments, glass cloth and the like, provide impregnated materials which have excellent shelf life. Furthermore, shaped structures formed from such impregnated materials are characterized by improved physical properties at relatively high temperatures.

The solid, fusible reaction products of the present invention generally have a Tripod Flow of from about 50 seconds to about 120 seconds. Tripod Flow determinations, noted in this application, were made according to the procedure set forth in a pamphlet entitled, "Standard Testing Method" WC–627–D/2, published by Union Carbide Plastics Company, a division of Union Carbide Corporation.

Bis(2,3-epoxycyclopentyl)ether is a liquid diepoxydicyclic aliphatic ether having a viscosity of about 28 centipoises at 27° C. and having the formula:

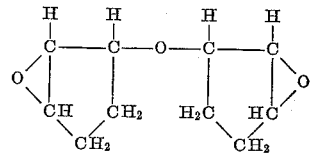

The aromatic amines which are reacted with bis(2,3-epoxycyclopentyl)ether to provide the solid, fusible reaction products of this invention are those aromatic amines which contain at least two primary amino groups per molecule wherein the amino groups, which can be on the same or different aromatic nuclei, are attached directly to an aromatic nucleus, which is generally a phenyl radical, through the nitrogen atom of the amino group.

Illustrative of suitable aromatic amines are those having the formula:

Formula I

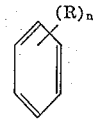

wherein each R, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $n$ is a whole number having a value of 2 to 6 inclusive; provided that at least two of the R's are primary amino groups.

Illustrative of hydrocarbon radicals for R are alkyl radicals, generally containing 1 to 20 carbon atoms inclusive and preferably containing 1 to 10 carbon atoms inclusive, such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclohexyl and the like; unsaturated alicyclic and unsaturated aliphatic hydrocarbon radicals, generally containing from 2 to 20 carbon atoms inclusive and preferably containing 2 to 10 carbon atoms inclusive, such as cyclopentenyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive, such as methoxymethyl, ethoxyethyl, 3-ethoxy-n-propyl, 4-ethoxy-n-butyl, 2-methoxycyclohexyl, phenoxymethyl, 2-phenoxyethyl and the like; aryl radicals, generally containing 6 to 20 carbon atoms inclusive and preferably containing 6 to 18 carbon atoms inclusive, such as phenyl, tolyl and the like, as well as halogenated aryl radicals such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p-ethylphenyl, p-n-propylphenyl, o-n-propylphenyl and the like; also, those hydrocarbon radicals, as described, which are substituted with one or more amino groups.

Exemplary of such aromatic amines are the following: o-phenylenediamine, p-phenylenediamine, m-phenylenediamine, benzidene, o-tolidine, o-dianisidine and the like.

Particularly desirable aromatic amines falling within the scope of Formula I are those amines having the formula:

Formula II

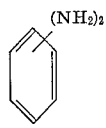

Among other suitable aromatic amines are those having the formula:

Formula III

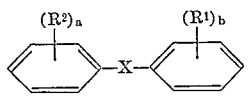

wherein $R^1$ and $R^2$ are as defined for R, $a$ and $b$ are whole numbers having a value of 1 to 5 inclusive and X is a divalent radical, as for example:

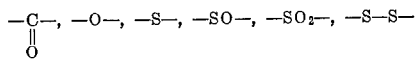

or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals; alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula III are those aromatic amines having the formula:

Formula IV

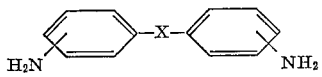

wherein X is sulfone ($SO_2$) or a divalent hydrocarbon radical, as previously described.

Also suitable for purposes of this invention are the aromatic amines produced on reacting aniline with formaldehyde. Specific aromatic amines falling within the scope of Formula III are the following: 4,4'-diaminodiphenylmethane, 4,4'-diaminodiphenylsulfone, bis(4-amino-2-chlorophenyl)methane and the like.

It is to be understood that mixtures of aromatic amines can be used if so desired.

The solid, fusible reaction products of bis(2,3-epoxycyclopentyl)ether and aromatic amines can be conveniently prepared by reacting a mixture containing at least about 0.5 mole of bis(2,3-epoxycyclopentyl)ether per amino hydrogen equivalent and preferably about 1 mole to about 2 moles of bis(2,3-epoxycyclopentyl)ether per amino hydrogen equivalent; at temperatures on the order of about 120° C. to about 150° C. to obtain a product generally having a Tripod Flow of about 50 seconds to about 120 seconds. More than about 2 moles of bis(2,3-epoxycyclopentyl)ether per amino hydrogen equivalent can be used, but this is not economically desirable.

As previously stated, the solid, fusible reaction products of this invention find wide utility as varnishes in the preparation of laminates and filament wound structures. In producing a varnish, the reaction product is dissolved in any suitable organic solvent to form a solution having a solids content of about 30 to about 70 percent by weight. As a rule, the organic solvent used is a ketone, such as methylethyl ketone, diisopropyl ketone and the like. This varnish is then used to impregnate, by any suitable method, for example, dipping, spraying and the like any desired material, for instance, glass cloth, glass filaments, carbon cloth, carbon filaments, nylon filaments, metal fibers, paper and the like. The impregnated material is then formed into a desired shape and the fusible reaction product cured to its infusible state.

The temperature to which each impregnated material is heated in order to effect a cure of the fusible reaction product will, of course, vary and depend, in part, upon the exact formulation of the fusible reaction product. As a rule, this temperature is in the range of about 80° C. to about 200° C. for a period of time ranging from about 1 to 6 hours. In the production of laminates, it is also customary to subject the impregnated material to elevated pressures.

A particularly desirable process for the production of shaped articles is to first react at least about 4 moles of bis(2,3-epoxycyclopentyl)ether per mole of aromatic primary diamine, and preferably about 4 to about 8 moles of bis(2,3-epoxycyclopentyl)ether per mole of aromatic primary diamine, removing from the reaction product unreacted starting materials, adding to the reaction product about a stoichiometric amount of an aromatic primary diamine and using this composition to form a varnish which is used to impregnate a desired material, subsequently utilized to form a shaped article, in a manner illustrated by the description previously given. Shaped articles produced in this manner have exceptionally good high temperature properties, particularly excellent flexural strength and flexural modulus at 400° F.

Removal of unreacted starting materials can be accomplished by any convenient method. As an illustration, the reaction product can be distilled at elevated temperatures under reduced pressures as is shown in Example 1 of this application.

For purposes of stoichiometric calculations one epoxy group is deemed to react with one amino hydrogen atom.

Suitable aromatic primary diamines have been previously described in this application.

If desired, conventional epoxy catalysts can be used in formulating varnishes containing the reaction products of this invention. These catalysts, which are well-known in the art, are exemplified by boron trifluoride and the like, and are used in order to accelerate curing of the reaction products.

The following examples further illustrate the present invention and are not intended to limit the scope thereof in any manner.

EXAMPLE 1

Sixteen hundred grams (8 moles) of bis(2,3-epoxycyclopentyl)ether were admixed with 198 grams (1 mole) of 4,4'-diaminodiphenylmethane and the resultant mixture was heated at a temperature of 150° C. for 2 hours. The reacted product was then vacuum distilled to a pot temperature of 170° C. while being maintained under a pressure of about 1 mm. of Hg. The fusible reaction product of bis(2,3-epoxycyclopentyl)ether and 4,4'-diaminodiphenylmethane was recovered in an amount of 1080 grams. This product was a solid at room temperature, about 23° C., was soluble in methylethyl ketone and had a Tripod Flow of 60 seconds.

EXAMPLE 2

Six hundred grams (3 moles) of bis(2,3-epoxycyclopentyl)ether were admixed with 198 grams (1 mole) of 4,4'-diaminodiphenylmethane and the resultant mixture heated at a temperature of 150° C. for 3¼ hours. The fusible reaction product of bis(2,3-epoxycyclopentyl) ether and 4,4'-diaminodiphenylmethane was recovered in an amount of 760 grams. This product was a solid at room temperature, was soluble in methylethyl ketone and had a Tripod Flow of 63 seconds.

EXAMPLE 3

Eighteen hundred grams (9 moles) of bis(2,3-epoxycyclopentyl)ether were admixed with 891 grams (4.5 moles) of 4,4'-diaminodiphenylmethane and the resultant mixture heated at a temperature of about 120° C. for 4 hours. The fusible reaction product of bis(2,3-epoxycyclopentyl)ether and 4,4'-diaminodiphenylmethane was recovered in an amount of 2600 grams. This product was a solid at room temperature, was soluble in methylethyl ketone and had a Tripod Flow of 70 seconds.

EXAMPLE 4

Eight hundred grams (4 moles) of bis(2,3-epoxycyclopentyl)ether were admixed with 248 grams (1 mole) of 4,4'-diaminodiphenylsulfone and the resultant mixture heated at a temperature of about 150° C. for 3¼ hours. The fusible reaction product of bis(2,3-epoxycyclopentyl)ether and 4,4'-diaminodiphenylsulfone was recovered in

Laminate 1

The laminating varnish was made up of methylethyl ketone, the reaction product of Example 1 and a stoichiometric amount of 4,4'-diaminodiphenylmethane.

Laminate 2

The laminating varnish was made up of methylethyl ketone, the reaction product of Example 2 and a stoichiometric amount of 4,4'-diaminodiphenylmethane.

Laminate 3

The laminating varnish was made up of methylethyl ketone and the reaction product of Example 3.

Laminate 4

The laminating varnish was made up of methylethyl ketone and the reaction product of 3.36 moles of bis-(2,3-epoxycyclopentyl)ether and 1 mole of 4,4'-diaminodiphenylmethane, having a Tripod Flow of about 74 seconds.

Control 2

The laminating varnish was made up of methylethyl ketone and a mixture of 2 moles of bis(2,3-epoxycyclopentyl) ether per mole of 4,4'-diaminodiphenylmethane.

|  | Control 1 | Control 2 | Laminate 1 | Laminate 2 | Laminate 3 | Laminate 4 |
|---|---|---|---|---|---|---|
| Flexural Strength, 75° F., p.s.i | 76,000 | Not measurable. | 72,900 | 75,600 | 74,000 | 72,000 |
| Flexural Modulus, 75° F., p.s.i | $3.5 \times 10^6$ | do | $3.72 \times 10^6$ | $4.03 \times 10^6$ | $3.6 \times 10^6$ | $3.68 \times 10^6$ |
| Flexural Strength, 300° F., p.s.i | 45,000 | do | 64,800 | 60,000 | 53,000 | 65,500 |
| Flexural Modulus, 300° F., p.s.i | $2.8 \times 10^6$ | do | $3.11 \times 10^6$ | $3.29 \times 10^6$ | $3.48 \times 10^6$ | $2.6 \times 10^6$ |
| Flexural Strength, 400° F., p.s.i | 10,600 | do | 52,900 | 48,500 | 47,600 | 39,000 |
| Flexural Modulus, 400° F., p.s.i | $1.2 \times 10^6$ | do | $2.85 \times 10^6$ | $3.25 \times 10^6$ | $3.15 \times 10^6$ | $2.5 \times 10^6$ | an amount of 1000 grams. This product was a solid at room temperature, was soluble in methylethyl ketone and had a Tripod Flow of 66 seconds.

EXAMPLE 5

Four hundred grams (2 moles) of bis(2,3-epoxycyclopentyl)ether were admixed with 248 grams (1 mole) of 4,4'-diaminodiphenylsulfone and the resultant mixture heated at a temperature of about 150° C. for 3¼ hours. The fusible reaction product of bis(2,3-epoxycyclopentyl) ether and 4,4'-diaminodiphenylsulfone was recovered in an amount of 620 grams. This product was a solid at room temperature, was soluble in methylethyl ketone and had a Tripod Flow of 50 seconds.

EXAMPLE 6

This example illustrates the excellent shelf life of materials impregnated with the fusible, reaction products of this invention as well as the excellent high temperature properties possessed by laminates in which the reaction products of this invention are used as laminating varnishes.

In each instance, laminates were prepared as follows: 181 weave glass cloth was impregnated by passage through a laminating varnish which had a solids content of about 55 to 60 percent by weight and in which the organic solvent was methylethyl ketone. Twelve plies of impregnated cloth were stacked, one upon another, and subjected to a pressure of 200 p.s.i.g. and a temperature of 320° F. for one hour. Each laminate was then subject to a 6 hour post-cure at a temperature of 400° F. Thereafter each laminate was subjected to tests which are indicated below, along with the results thereof. Tests were determined according to the procedures described in Federal Test Method Standard No. 406.

Control 1

The laminating varnish was made up of a mixture of methylethyl ketone, diglycidylether of 2,2-bis(4-hydroxyphenyl)propane and 4,4'-diaminodiphenylmethane wherein the amine was present in stoichiometric amounts.

Impregnated plies of glass cloth were prepared as described above and allowed to stand at a temperature of 23° C. and the time within which the epoxy cured to an infusible product noted.

Laminating varnish

Control 3—same as Control 1
Impregnated Plies 1—same as Laminate 1
Impregnated Plies 2—same as Laminate 2
Impregnated Plies 3—same as Laminate 3
Impregnated Plies 4—same as Laminate 4

Shelf life

Control 3—1 week
Impregnated Plies 1, 8 months—no cure
Impregnated Plies 2, 8 months—no cure
Impregnated Plies 3, 8 months—no cure
Impregnated Plies 4, 8 months—no cure Other aromatic amines which react with bis(2,3-epoxycyclopentyl)ether to provide reaction products suitable for purposes of this invention are: 4,4'-diphenylenediamine and the like.

What is claimed is:

1. Process of forming a shaped structure which comprises impregnating a material with a solid reaction product of bis(2,3-epoxycyclopentyl)ether and an aromatic amine having at least two primary amino groups per molecule, said reaction product having a Tripod Flow of about 50 to about 120 seconds, forming said impregnated material into a shaped structure and curing said reaction product to its infusible state.

2. Process of forming a shaped structure which comprises reacting a mixture containing at least about 4 moles of bis(2,3-epoxycyclopentyl)ether per mole of an aromatic primary diamine to form a solid fusible reaction product having a Tripod Flow of about 50 seconds to about 120 seconds, removing from the said reaction product unreacted starting materials, adding to said reaction product about a stoichiometric amount of an aromatic primary diamine to form a curable composition, impregnating a material with said composition, forming said impregnated material into a shaped structure and curing said composition to its infusible state.

3. Process of forming a shaped structure which comprises reacting a mixture containing at least about 0.5 mole of bis(2,3-epoxycyclopentyl)ether per aminohydrogen equivalent of an aromatic primary diamine to form a solid fusible reaction product having a Tripod Flow of about 50 seconds to about 120 seconds, adding to said reaction product about a stoichiometric amount of an aromatic primary diamine to form a curable composition, impregnating a material with said composition, forming said impregnated material into a shaped structure and curing said composition to its infusible state.

4. Process as defined in claim 3 wherein said aromatic amine has the formula:

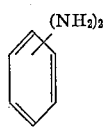

5. Process as defined in claim 3 wherein said aromatic amine has the formula:

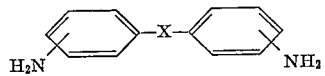

wherein X is a member selected from the group consisting of —SO$_2$— and a divalent aliphatic hydrocarbon radical having a maximum of 6 carbon atoms.

6. Process as defined in claim 3 wherein said amine is 4,4'-diaminodiphenylmethane.

7. Process as defined in claim 3 wherein said amine is 4,4'-diaminodiphenylsulfone.

8. Process as defined in claim 3 wherein said amine is 4,4'-diphenylenediamine.

References Cited
UNITED STATES PATENTS

| | | | |
|---|---|---|---|
| 2,981,701 | 4/1961 | St. Clair et al. | 260—47 |
| 3,063,949 | 11/1962 | Phillips et al. | 260—2 |
| 3,155,743 | 11/1964 | Newey | 260—47 |

WILLIAM H. SHORT, *Primary Examiner.*

LEON J. BERCOVITZ, *Examiner.*

T. E. PERTILLA, *Assistant Examiner.*